United States Patent [19]

Zurcher

[11] 3,984,257
[45] Oct. 5, 1976

[54] NO FAULT BATTERY INSERTION DEVICE
[75] Inventor: Rudolf F. Zurcher, Newport Beach, Calif.
[73] Assignee: Hughes Aircraft Company, Culver City, Calif.
[22] Filed: June 27, 1975
[21] Appl. No.: 591,215

[52] U.S. Cl. .................................. 429/1; 429/96
[51] Int. Cl.² ........................................ H01M 2/10
[58] Field of Search ............ 136/173; 58/23 BA, 53, 58/54, 56, 88 R, 23 R

[56] References Cited
UNITED STATES PATENTS

| | | |
|---|---|---|
| 2,982,807 | 5/1961 | Dassow et al. ...................... 136/173 |
| 3,608,304 | 9/1971 | Schaad ............................. 58/23 BA |
| 3,846,971 | 11/1974 | Ho et al. ............................ 58/23 R |
| 3,856,577 | 12/1974 | Oki et al. ........................... 136/173 |
| 3,887,393 | 6/1975 | La Rue .............................. 136/173 |
| 3,945,193 | 3/1976 | Yasuda et al. ...................... 58/88 R |

Primary Examiner—Donald L. Walton
Attorney, Agent, or Firm—Allen A. Dicke, Jr.; William H. MacAllister

[57] ABSTRACT

Battery operated device has battery wells into which batteries are inserted. Spring-loaded rings in the wells are configured so that electrical contact is not made when the batteries are inserted in the wrong polarity orientation but permit contact when the batteries are correctly inserted.

6 Claims, 5 Drawing Figures

2

NO FAULT BATTERY INSERTION DEVICE

BACKGROUND

This invention is directed to a device positioned in a battery well which prevents electric contact when the battery is inserted in the wrong polarity orientation.

Many modern transistorized circuits are harmed when the wrong polarity of electrical supply is applied to them. Furthermore, none of the transistorized circuits will work with incorrect polarity. In battery-powered electronic circuits the application of incorrect polarity can be achieved by controlling the manner in which the battery is installed in the battery pocket. Horton U.S. Pat. No. 3,537,909 and Cich U.S. Pat. No. 3,655,452 each have battery pockets in which a battery can only be inserted in one orientation, and in this way prevent the application of the wrong polarity to the circuitry. However, the user does not always recognize the control upon battery insertion. When the user finds that the battery does not smoothly slide into place, he applies additional force. This force is destructive in battery recesses which are of a configuration which accept a battery in only one orientation.

Thus, it is necessary to provide a battery receptacle or well which will receive a battery positioned in either the correct or the incorrect polarity, but will prevent electrical connection when the battery is inserted in the incorrect polarity.

SUMMARY

In order to aid in the understanding of this invention it can be stated in essentially summary form that it is directed to a battery well in a battery-powered device, with the battery well being able to receive the battery inserted in either polarity but with specialized contact structure so that electrical contact is made to the battery only when it is inserted in the correct polarity orientation.

It is thus an object of this invention to provide a no-fault battery insertion device in a battery well so that a battery inserted in the well is electrically connected only when it is inserted in the correct polarity orientation. It is another object to provide a battery-powered device which has a battery receiving receptacle or well therein which will receive the battery in either polarity orientation to prevent distortion by forced battery insertion but prevents electrical connection to the battery if it is in the incorrect polarity orientation. It is a further object to provide a battery-powered device which has two battery wells therein, one for each battery orientation, with one having a ring contact which only makes contact with the battery case terminal and the other having a flat contact which only makes contact with the battery nose button terminal, the ring contact and the flat contact being configured and mounted so that they cannot make contact with the other terminal of the battery.

Other objects and advantages of this invention will become apparent from a study of the following portion of the specification, the claims and the attached drawings.

DESCRIPTION

Figure 1:
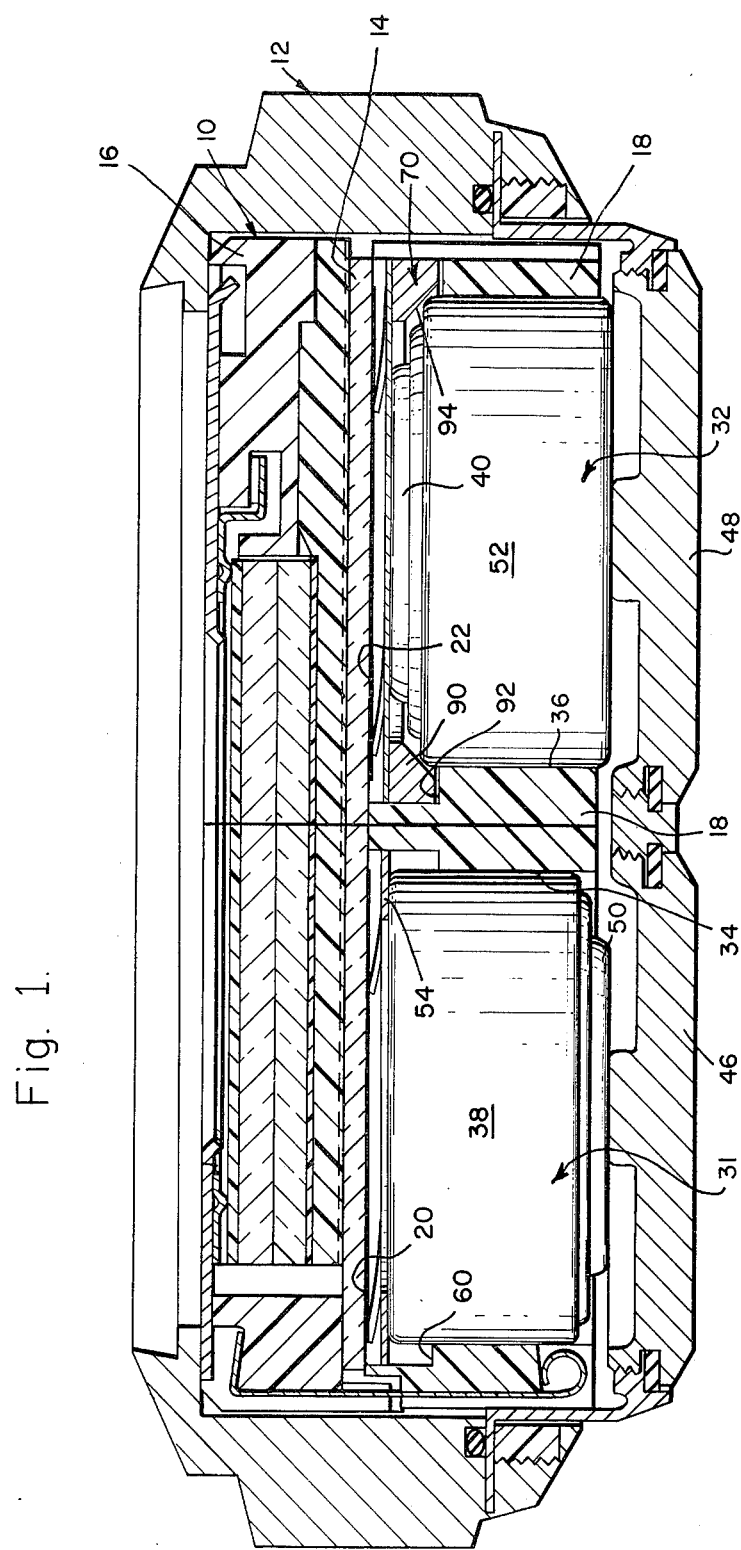
FIG. 1 is a section through the central axis of a digital watch through the center of the two battery wells to show one embodiment of the no-fault battery insertion device in each of the wells for opposite polarity.

FIG. 1 shows watch module 10 embodying the no-fault battery insertion device of this invention as being positioned in watch case 12. Watch module 10 includes substrate 14 clamped between top spacer 16 and a bottom spacer 18. The manner in which the spacers are clamped on the substrate and the manner in which the substrate is located with respect to the spacers is described in more detail in Roger A. Burke, Bela Somogyi and Rudolf F. Zurcher application Ser. No. 563,927, filed Mar. 31, 1975, for "Electronic Watch Construction." Substrate 14 is the principal carrier of electronics and electrical interconnections of the electronic watch module. Substrate 14 is preferably a ceramic substrate for its dimensional stability and printed circuitry is printed on both the top and bottom thereof. Contact rings 20 and 22 are printed on the bottom side of substrate 14 above battery wells 34 and 36, respectively. Contact rings 20 and 22 are appropriately connected to the electronic circuitry to power the watch.

Batteries 31 and 32 are respectively positioned in battery wells 34 and 36 to provide the power. Battery hatches 46 and 48 are removable from the watch case to permit battery replacement. The batteries are oppositely arranged; that is, battery 31 has its negative contact button 50 directed downwardly while battery 32 has its positive case 52 directed downwardly. These battery terminals are connected together through the metallic battery hatches and the metallic watch case so that batteries 31 and 32 are serially connected. As described in the Roger A. Burke et al. application identified above, the watch case thus has an intermediate voltage level between the relatively positive case 38 of battery 31 and the relatively negative contact button 40 of battery 32.

No-fault battery insertion devices are incorporated so that neither electrical nor mechanical damage can occur if either of batteries 31 or 32 is incorrectly inserted in the wrong polarity position or orientation even if the batteries are forced into the wells and the battery hatch covers are screwed into place against a solid stop. The battery hatch covers themselves may carry compressible contact springs to maintain contact force and accomodate battery size tolerances.

Figure 2:
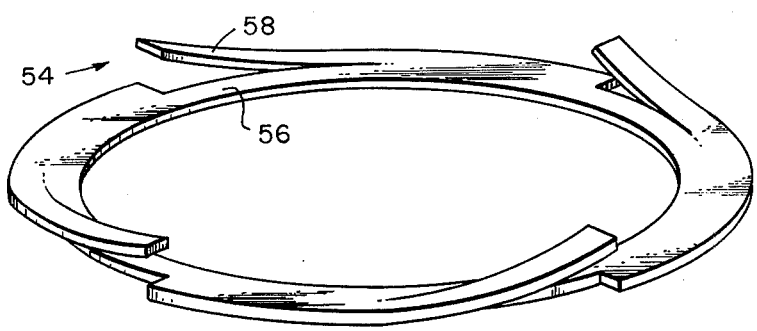
FIG. 2 is a perspective view of the device for battery case contact.
Figure 3A:
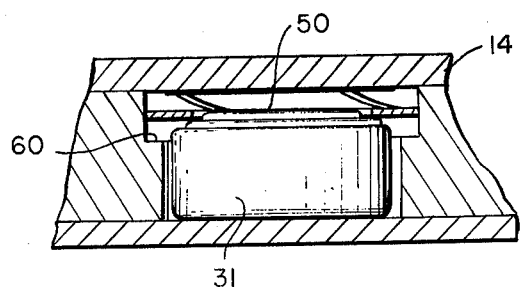
FIG. 3a is a section through the battery well showing the operation of the device of FIG. 2 with a battery inserted in incorrect orientation.

FIG. 1 shows the no-fault battery insertion device 54 in battery well 34 for the correct connection of battery 31. Device 54, as seen best in FIG. 2, comprises ring 56 which has spring fingers 58 integrally formed thereof and pressed upward out of the plane thereof. The spring fingers 58 engage against contact ring 20 to urge ring 56 downward against shoulder 60, see FIG. 1, when no battery is inserted in the well. The preferred material of device 54 is metallic spring material or an electrically conductive elastomeric may be substituted. When battery 31 is inserted in the correct polarity as shown in FIG. 1, ring 56 engages against the upper end of case 38, as seen in FIG. 1, around the outer periphery thereof. Thus, contact is made from case 38 through ring 56, spring fingers 58, and to contact ring 20. Thus, electrical contact is achieved from the case to contact ring 20 when battery 31 is inserted with correct polarity. When so inserted as shown in FIG. 1, negative contact button 50 is in electric contact with battery hatch 46 so that the circuit is completed through the battery. When battery 31 is inserted with incorrect polarity, as shown in FIG. 3a, ring 56 engages against the shoulder of case 38 around button 59 without making electric contact with button 50 so that electrical continuity is not achieved. However, the battery can be physically inserted and the hatch cover closed so that no structural or electrical damage is incurred by incorrect battery insertion.

Figure 4:
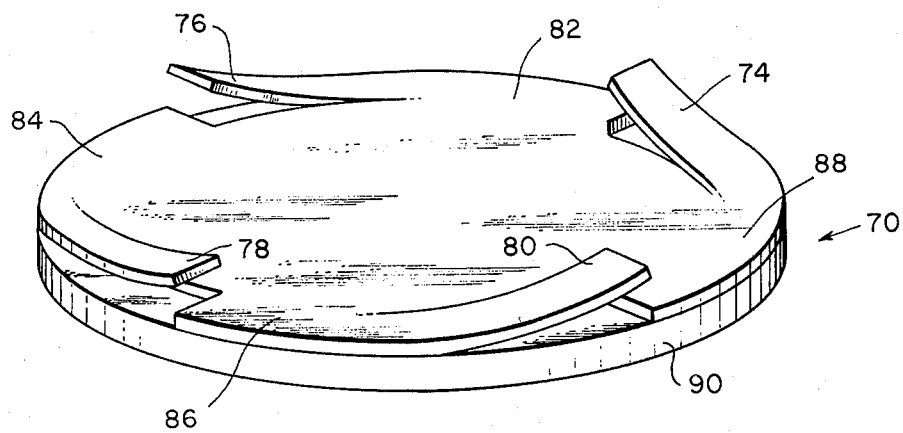
FIG. 4 is a perspective view of the device for battery button contact.

FIG. 1 shows no-fault battery insertion device 70 positioned in battery well 36 to permit the introduction of battery 32 in either insertion position without structural damage and to present electrical connection when the battery is inserted on the wrong electrical polarity position. Device 70, see FIG. 4, has for its electric contact, metallic disc 72 which has four integral spring fingers 74, 76, 78 and 80 pressed upward out of the plane thereof. As seen in FIG. 1, the spring fingers mechanically engage and electrically contact the contact ring 22. Between the spring fingers metallic disc 72 extends outward in its plane to leave flanges 82, 84, 86 and 88. Key ring 90 is an insulator ring which is mounted under flanges 82–88 and is pressed down on shoulder 92 by spring fingers 74–80 in the absence of a battery in battery well 36. When a battery is correctly inserted, as is battery 32 in FIG. 1, negative contact button 40 contacts the underside of metallic disc 72 before the battery case shoulder around the button on the battery contacts angular engagement face 94 on the lower inner surface of key ring 90. Thus, electrical continuity is achieved from contact button 40 to disc 72 and thence through its spring fingers 74–80 to contact ring 22. Thus, a correctly inserted battery is electrically connected in the well.

Figure 3B:
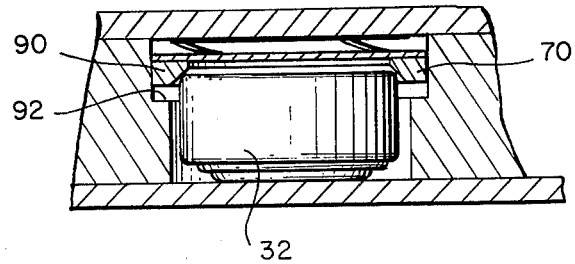
FIG. 3b is a section similar to FIG. 3a through the other battery well with the battery shown as inserted in the incorrect orientation.

On the other hand, as seen in FIG. 3b, when the battery 32 is incorrectly inserted, the upper peripheral corner of the battery case engages key ring 90 before the battery case engages with the metallic disc contact 72 of device 70 so that there is no electrical contact. However, the device 70 is resiliently deflected on its spring fingers so that no mechanical damage takes place even when the battery is fully inserted and thrust into place, as shown in FIG. 3b.

In this manner, the no-fault battery insertion structure permits insertion of a battery in either polarity position but only permits electrical contact thereto when the battery is inserted in its proper polarity position. Thus, application of voltage of incorrect polarity by wrong battery insertion is eliminated, and at the same time the potential for physical damage from wrong battery insertion is also eliminated.

All references in the specification are incorporated herein in their entirety by this reference. This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. An electrical device having a battery well therein for receipt of a battery for powering the electrical device, a cover over the battery well for closure of the battery well, said well having a shoulder therein, said shoulder facing away from said well cover, the battery having a protuberant contact button at one end thereof and having a flat contact area on the opposite end thereof;

means in said battery well for making electrical contact with the flat contact area of the battery when the battery is inserted in said well in the correct polarity orientation and for preventing electric contact with the flat battery terminal when the battery is inserted in said well in incorrect polarity orientation and for permitting closure of the cover over said well with the battery in both correct and in incorrect polarity orientation, said means comprising a contact ring in said well positioned to engage around the protuberant contact button when the battery is inserted in incorrect polarity orientation and to contact the periphery of the flat battery contact area when the battery is inserted in the correct polarity orientation, said ring being substantially planar and having integral spring fingers on said ring bent out of the plane of said ring to urge said ring toward battery engagement, said ring being spring urged against said shoulder by said spring fingers in the absence of a battery in said well.

2. An electrical device having a battery well therein for receipt of a battery having a protuberant contact button on one end thereof for powering the electrical device and having a cover over said battery well for closure of said battery well;

means in said battery well for making electrical contact with the protuberant battery terminal when the battery is inserted in said well in the correct polarity orientation and for preventing electric contact with the protuberant battery terminal when the battery is inserted in said well in incorrect polarity orientation and permitting closure of said cover over said well with the battery in both correct and in incorrect polarity orientation, said means having an insulated key ring having an interior diameter greater than the button and having a metallic contact disc extending thereacross for contact by said button and said means having a spring urging said metallic contact disc toward the well opening so that when a battery is inserted in said well in correct polarity orientation the contact button thereon contacts said contact disc and when the battery is inserted in said well in incorrect polarity orientation the battery case engages said insulated key ring without electric contact to said metallic contact disc to prevent electrical continuity.

3. The device of claim 2 wherein said springs are integrally formed with said metallic contact disc and are bent therefrom.

4. The device of claim 3 wherein said well has a shoulder facing away from the covered end of the well and said spring urges said key ring toward said shoulder in the absence of a battery in the well.

5. An electrical device having first and second battery wells therein respectively for receipt of first and second batteries each having a protuberant contact button, said batteries being for powering the electrical device, a cover for closure of said battery wells; and first and second means respectively in said first and second wells for making electrical contact with a battery terminal when the battery is inserted in its well in the correct polarity orientation and for preventing electric contact with a battery terminal when the battery is inserted in its well in incorrect polarity orientation and for permitting closure of the cover over said wells with the batteries in both correct and incorrect polarity orientation;

said first means comprising a contact ring positioned in said first well to engage around the protuberant contact button when the first battery is inserted in incorrect polarity orientation and said second means comprises an insulated key ring in said second well having an interior diameter greater than the button on the second battery and said key ring has a metallic contact disc extending thereacross for contact by the button and said second means has a spring urging said metallic contact disc toward said second well opening so that when the second battery is correctly inserted in said second well in correct polarity orientation the contact button thereon contacts said contact disc and when the battery is inserted in said second well in incorrect polarity orientation the second battery case engages said insulated key ring without electrical contact to said metallic contact disc to prevent electrical continuity.

6. The device of claim 5 wherein said first means further comprises a metallic ring having an inner opening larger than the contact button, said ring being substantially planar, and integral contact fingers on said ring bent out of the plane of said ring to urge said ring toward battery engagement and said second means further comprises a shoulder facing away from the covered end of the well and said spring urges said key ring into contact with said shoulder in the absence of a battery in the well.

* * * * *